United States Patent

Behr

[15] 3,686,649

[45] Aug. 22, 1972

[54] MAGNETIC POSITIONING MECHANISM WITH TRAPEZOIDAL HEAD

[72] Inventor: Michael I. Behr, South Pasadena, Calif.

[73] Assignee: Burroughs Corporation, Detroit, Mich.

[22] Filed: Nov. 18, 1970

[21] Appl. No.: 90,583

[52] U.S. Cl. ..................340/174.1 C, 179/100.2 S, 340/174.1 F

[51] Int. Cl. .......G11b 5/22, G11b 5/52, G11b 21/10

[58] Field of Search ..340/174.1 B, 174.1 C, 174.1 F; 179/100.2 S, 100.2 C, 100.2 MI, 100.2 CB, 100.2 T

[56] References Cited

UNITED STATES PATENTS

| | | | |
|---|---|---|---|
| 3,404,392 | 10/1968 | Sordello | 340/174.1 C |
| 3,158,972 | 5/1965 | Sippel | 340/174.1 C |
| 3,209,338 | 10/1965 | Romvari | 340/174.1 C |
| 3,092,692 | 6/1963 | Javorik | 340/174.1 F |
| 3,092,815 | 6/1963 | Hinze | 340/174.1 F |
| 2,929,670 | 3/1960 | Garrity | 179/100.2 C |
| 3,391,254 | 7/1968 | Honig | 340/174.1 F |
| 3,066,197 | 11/1962 | Vemurz | 179/100.2 C |
| 3,569,984 | 3/1971 | Watson | 340/174.1 F |
| 3,217,303 | 11/1965 | Najima | 179/100.2 CB |
| 3,175,205 | 3/1965 | Auyang | 340/174.1 C |

*Primary Examiner*—Vinent P. Canney
*Attorney*—Christie, Parker & Hale

[57] ABSTRACT

Method and apparatus for positioning a magnetic transducer adjacent the recording medium on a face of a magnetic recording disk is provided. Information is recorded on the disk in one or more information zones with an information head arranged adjacent each of these zones. A control zone provided on a face of the disk is adjacent a control transducer which is coupled to the information heads. The heads are also coupled to a mechanical position controller for positioning the heads radially on the disk. Recorded in the control zone are a plurality of magnetic transitions in lines extending at an angle relative to a disk radius. In a short segment, neglecting disk curvature, the magnetic regions bounded by the transition lines are in the form of interlaced trapezoids, and the recording medium moves relative to the control transducer in a direction parallel to the parallel sides of the trapezoids. The time required for the magnetic transducer to travel from one magnetic transition to the next is therefore a function of the transducer's position between the parallel sides of the trapezoid, that is, the radial position relative to the disk. The time interval so measured is compared with a reference time signal to generate an error signal which is fed back to the mechanical position control so that the magnetic transducers are positioned in the desired position.

13 Claims, 8 Drawing Figures

INVENTOR.
MICHAEL I. BEHR

BY
Christie, Parker & Hale
ATTORNEYS

MAGNETIC POSITIONING MECHANISM WITH TRAPEZOIDAL HEAD

BACKGROUND

Magnetic disk memories have become an important item of peripheral equipment for computers and the like in order to provide temporary or permanent information storage during computer operations. In one embodiment, these magnetic disk memories comprise one or more rapidly rotatable disks having a magnetic recording medium on the faces of the disk. One or more recording heads are arranged adjacent the flat face of the disk for reading and writing information on the magnetic recording medium. In order to achieve most efficient utilization of the recording surface, it is desirable to have information recorded at the highest possible density. Thus, individual data bits along a circumferentially extending track on the face of the disk may be recorded at a density of thousands or even tens of thousands of bits per inch of track. Similarly, a large number of very narrow circumferential tracks are provided and it is desirable to locate these tracks as close together as possible in a radial direction.

In one type of magnetic disk memory, the information head or recording head is movable radially of the disk so that the magnetic transducers mounted in the head are selectively positioned adjacent a selected recording track. In this manner a few transducers are employed for recording and reading data on many tracks. In order to make such a system operable, it is mandatory that the location of the head adjacent the track be known and carefully controlled. Thus, if it is desired to read information on a selected track, the information transducer must be arranged adjacent that track, and in order to achieve high speed operation the transducer must be brought to the desired position quickly and accurately.

Various mechanical, hydraulic, and electromagnetic techniques have been employed for positioning the information head adjacent the disk. These positioning arrangements employ mechanical or optical techniques for monitoring the information head position for providing a feedback signal to control position. Neither of these measuring techniques for head position is completely satisfactory, either because of the appreciable amount of auxiliary equipment required or because of the limitation on the number of tracks that can be accommodated. Present designs have been limited to appreciably fewer then 200 tracks per inch extending radially on the disk, and it appears quite doubtful that such measurement and control techniques can ever be extended beyond about 200 tracks per inch. It is, however, highly desirable to provide for information head positioning with greater sensitivity so that more than 200 tracks per inch can be accommodated on a magnetic recording disk.

BRIEF SUMMARY OF THE INVENTION

Thus, in practice of this invention according to a preferred embodiment there is provided method and apparatus for positioning an information head adjacent a moving magnetic recording medium in a direction transverse to the direction of relative movement. A control head is coupled to an information head so that the information head position is directly responsive to control head position. The control head senses a recorded signal on the magnetic recording medium having a signal characteristic uniquely representative of a sensing head position. This sensed signal is compared with a reference signal and the resultant comparison or error signal is employed for positioning the control head in a direction transverse to the direction of relative movement. In a preferred embodiment, the recorded signal comprises a plurality of magnetic transitions arranged so that the time interval between adjacent transitions is a function of control transducer position.

DRAWINGS

These and other features and advantages of the present invention will be appreciated as the same becomes better understood by reference to the following detailed description of a presently preferred embodiment when considered in connection with the accompanying drawings wherein.

Throughout the drawings like numerals refer to like parts.

DESCRIPTION

Figure 1:
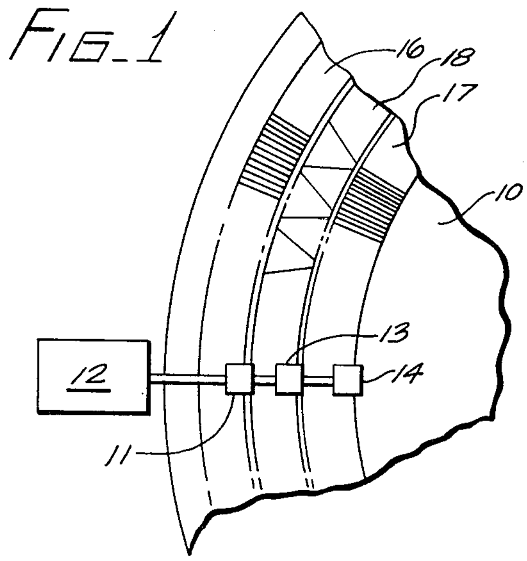
FIG. 1 illustrates a fragment of magnetic recording disk having transducers positioned according to principles of this invention.

FIG. 1 illustrates schematically a fragment of magnetic recording disk 10 constructed according to principles of this invention. Such a recording disk is a conventional article, in the order of several inches to a couple feet in diameter, formed of a nonmagnetic material with a thin magnetic recording medium deposited on the two opposite faces of the disk. Such disks are commonly mounted on precision bearings and rotated at high speed during operation so that each point in selected tracks on the disk passes before an information transducer at frequent intervals. In a commercial unit, one or a plurality of such disks and one or more information transducers may be employed. The rate of rotation of the disk 10 is normally carefully controlled so that only a very small percentage change in speed of rotation is observed. Conventional angle encoders, clock tracks and the like are employed for measuring circumferential position of the disk. Such features are conventional and, not being of any significance in practice of this invention, are not set out in detail herein.

As mentioned hereinabove, information in the form of magnetic signals is recorded on a face of the disk by transducers mounted in an information head 11 arranged adjacent a face of the disk. The information head 11 is coupled mechanically to a position controller 12. The mechanical coupling between the information head 11 and controller 12 is conventional and of no particular concern in practice of this invention. Neither is the exact form of the position control 12, which is also conventional. Thus, for example, the position control can be a so-called voice coil actuator, which is a magnetic positioning device very similar to that employed in loudspeakers. These are generally preferred since they are inexpensive, fast, accurate, and readily controlled with conventional circuitry. If desired, however, other mechanical, electromechanical or hydraulic position control mechanisms can be employed for the position control 12.

In addition to the information head 11 coupled to the position controller 12 in the illustrated embodiment, there is further mechanical coupling to a position control head 13 and to a second information head 14. Additional information heads may be coupled to the same position controller if desired. Likewise, if desired, more than one such position control and head combination can be employed with an individual magnetic recording disk.

The outermost information head 11 is arranged adjacent an outer circumferentially extending information zone 16 on the face of the disk. Similarly, the inner recording head 14 is arranged adjacent an inner information zone 17. These information zones comprise areas in which information is recorded and read during operation of the disk. Typically, information is put onto the disk by a magnetic transducer in the information head as a sequence of signals of varying magnetic polarity. As these signals again traverse past the information head, they may be read by the transducer, all in a conventional manner. The information zones 16 and 17 each comprise a large number of concentric circumferentially extending tracks within which data is recorded. Each of the concentric recording tracks in a zone is distinct and the information head must be accurately positioned opposite a selected track before writing or reading information to avoid errors.

In order to position the information head adjacent a selected track, the position of the head should be known and an error signal fed back to the position control in a conventional servo loop for precise positioning. A circumferentially extending control zone 18 is provided on the face of the disk adjacent the control head 13 for providing a control signal uniquely representative of the radial position of the control head relative to the disk. In a preferred embodiment, the control signals recorded in the control zone comprise a plurality of magnetic transitions between regions of opposite magnetic polarity, such as illustrated schematically in FIG. 3.

Figure 3:
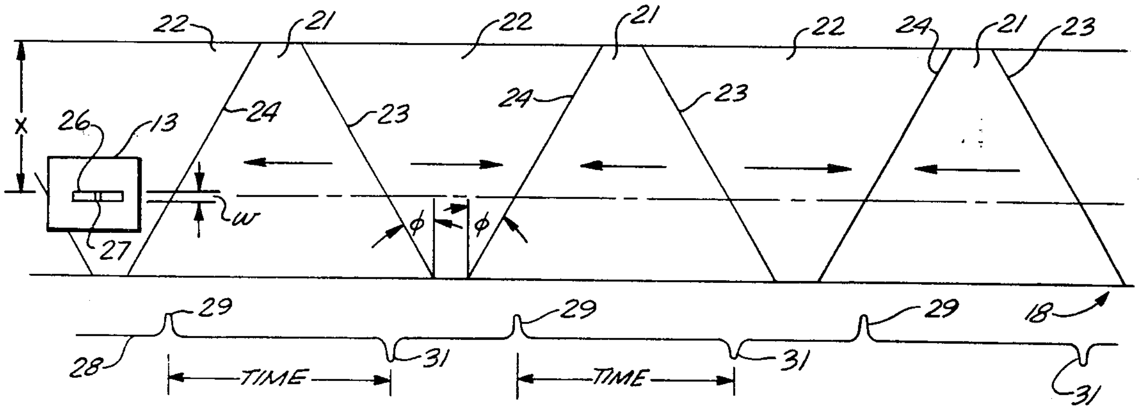
FIG. 3 illustrates schematically a pattern of magnetic transitions on the disk of FIG. 1 for controlling head position.

FIG. 3 illustrates schematically a fragment of a control zone 18 such as may be employed in practice of this invention. As illustrated herein, the control zone is represented as being linear in extent rather than curved as on the actual face of the disk in order to simplify the explanation. The extension of the principles to the slightly curved control zone of a recording disk will be apparent to one skilled in the art, and as a matter of practice, the linear approximation of FIG. 3 is reasonable in light of the relatively small curvature encountered in the control zone of a practical disk.

The control zone 18 contains a plurality of regions 21 wherein the magnetic medium on the surface of the disk is magnetized with a selected polarity as indicated by the schematic arrows. Interspersed between the first regions 21 having a first magnetic polarity are second regions 22 having the opposite magnetic polarity. Between the region of first polarity 21 and the region 22 of second polarity, there is a line of magnetic transition 23 and similarly between the region having a second polarity 22 and the first polarity 21 there is a line of magnetic transition 24.

It is preferred that the lines of magnetic transition 23 and 24 be at a common angle $\phi$ from a line perpendicular to the sides of the control zone 18 (on a circular disk the angle $\phi$ is between the transition lines and a disk radius). Thus, each magnetic region 21 and 22 along the control zone is in the form of a symmetrical trapezoid with the two regions of opposite polarity represented by interlaced trapezoids having their parallel sides formed by the edges of the control zone. The lines of magnetic transition 23 and 24 are skewed relative to the sides of the zone at an angle that is the complement of $\phi$.

The control head 13 is arranged so as to be adjacent the magnetic regions in the control zone 18. The control head 13 comprises a control transducer 26 having a narrow magnetic gap 27 of conventional form. As the disk is operated, the control zone 18 scans past the magnetic transducer 26 so that the gap 27 alternately traverses the opposite types of magnetic transition lines 23 and 24. As the magnetic gap 27 traverses a magnetic transition, a signal is induced in the transducer as indicated by the schematic line of signals 28 in FIG. 3. The polarity of the induced signal is dependent on the direction of change of the magnetic transition. Thus, for example, as the magnetic gap traverses one polarity of magnetic transition 24, a positive-going signal pulse 29 is generated. Similarly, as the gap traverses a transition 23 of the opposite polarity, a negative-going pulse 31 is generated in the control transducer.

The time interval between a positive-going pulse 29 and a negative-going pulse 31 in the control transducer 26 is dependent on the distance between the lines of magnetic transition 24 and 23, respectively, as sensed by the control transducer. This time interval is a function of the angle $\phi$ and the distance $x$ between the control transducer 26 and the edge of the control zone (and also the carefully controlled disk speed). In the illustrated schematic FIG. 3, the time interval is a linear function of $x$, and in a disk it is nearly linear, modified only by the curvature of the track at the control zone. Thus, it will be apparent that by measuring the time interval between the pair of pulses 29 and 31, and knowing the angles $\phi$, the distance $x$ of the control transducer from the edge of the control zone is readily determined.

The resolution or ability to know the distance $x$ with precision is determined by the angle $\phi$ and the width $w$ of the magnetic gap in a direction transverse to the extent of the control zone 18. The width of the gap, which is usually the width of the transducer, is to be distinguished from the gap length which is the distance between the pole pieces of the transducer. In order to obtain good resolution, it is desirable to have the gap width $w$ as small as possible. Similarly, resolution is increased by increasing the angle $\phi$ since the rate of change of the time interval as a function of $x$ is thereby increased. Although there is no theoretical upper or lower limit for $\phi$, there are practical limits in that it is undesirable to have the angle $\phi$ too small since insufficient resolution is obtained, and it is undesirable to have the angle $\phi$ too large since it is desirable to obtain many cycles of time interval pulses to permit the control head to be brought to its desired position in a fraction of one revolution of the recording disk.

Figure 2:
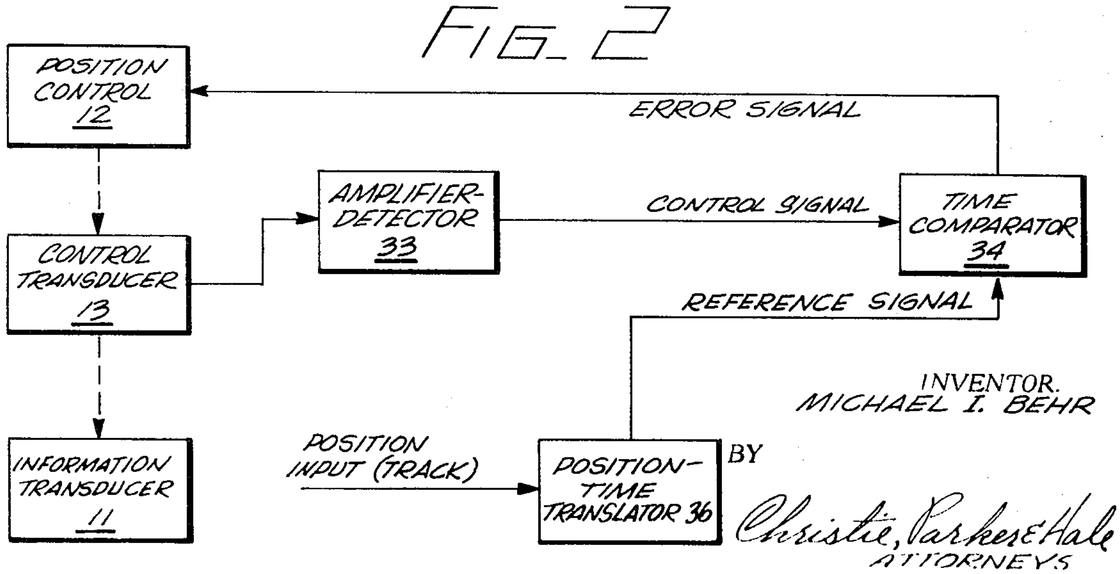
FIG. 2 illustrates in block diagram form the control loop for the positioning system of FIG. 1.

FIG. 2 illustrates in block form the simple servo loop employed for position control. As illustrated therein, the signals from the control transducer 13 are coupled to an amplifier-detector 33 which serves to amplify the signal pulses, distinguish their polarity, and provide a time interval control signal to a time comparator 34. A reference signal is provided to the time comparator 34 by a position-time translator 36, an input to which is a position signal, such as, for example, identification of a desired recording track. The position-time translator 36, can, for example, be a simple "look-up table" wherein the time interval corresponding to a selected track is stored in a memory. The time interval can, for example, be the number of pulses from a master oscillator (not shown) that would occur in the time interval between pulses 29 and 31 (FIG. 3) for a track at a selected distance $x$ from the edge of the control zone.

The time comparator generates a comparison or error signal from the control signal and reference signal, and this error signal is applied to the position control 12 in a conventional feed-back servo for moving the control transducer and information transducer 11 that are mechanically connected thereto. Such servo control loops employing a control signal to generate an error signal by reference to a reference signal for controlling position are quite conventional. The means for obtaining a control signal from the recording disk is of significance in practice of this invention. Other suitable servo loops employing the time signal from the control transducer can readily be provided by one skilled in the art.

Figure 4:
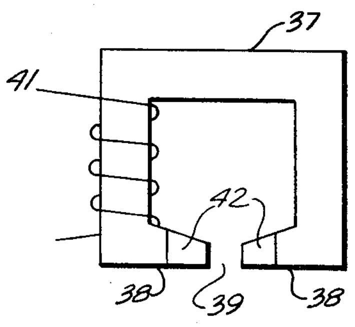
FIG. 4 illustrates schematically a recording transducer for providing the transitions of FIG. 3.
Figure 5:
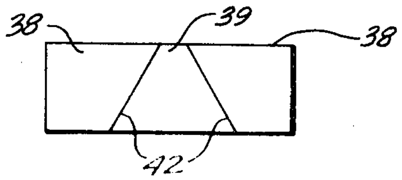
FIG. 5 is another view of the transducer of FIG. 4.

FIGS. 4 and 5 illustrate semi-schematically a recording transducer suitable for recording the regions of opposite polarity on the control zone. Initially, the entire control zone is polarized in one direction and then a suitable transducer, such as that illustrated in FIGS. 4 and 5, is moved along the control zone to reverse the polarity in selected trapezoidal shaped areas. The transducer comprises a U-shaped core 37 formed with integral pole pieces 38 spanning a tapered magnetic gap 39. A magnetic flux is induced in the core 37 by a current-carrying coil 41. A magnetic recording medium adjacent the gap 39 is magnetized in the single selected polarity, as determined by the direction of current of the coils 41, in a region corresponding to the area of the gap. Thus the lines of magnetic transition 23 and 24 (FIG. 3) lie along the edges 42 of the pole pieces 38. The transducer of FIGS. 4 and 5 has been illustrated schematically and details of construction such as laminations, complementary gaps to equalize magnetic flux, coil design, and the like will be apparent to one skilled in the art.

In order to use the recording transducer of FIGS. 4 and 5, it is arranged adjacent the desired control zone of a disk wherein the entire control zone is polarized in one direction. As the disk is slowly rotated, the current through the coil 41 is intermittently pulsed for a short interval to provide a region of opposite polarity with sharp lines of transition between that region and the adjacent regions.

If desired, rather than employing substantially trapezoidal regions of opposite magnetic polarity, an array of diagonal transitions can be provided with other arrangements. Thus, for example, interlaced trapezoidal regions of one magnetic polarity can be separated by narrow diagonal bands of opposite magnetic polarity to provide greater ease of control zone recording for particularly wide control zones.

Figure 6:
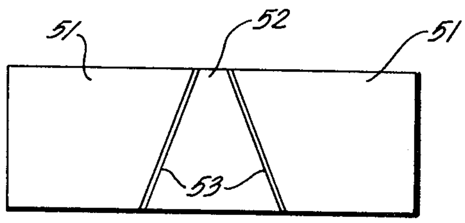
FIG. 6 illustrates the face of an alternative recording transducer.

Such an arrangement is illustrated in FIG. 6, which comprises a view of the face of a magnetic recording transducer, the view being analogous to that illustrated in FIG. 5. As illustrated in this embodiment, the recording transducer comprises a pair of pole pieces 51 which are interconnected by a U-shaped magnetic member (not shown) similar to the member 37 illustrated in FIG. 4. A trapezoidal gap is provided between the pole pieces 51 and inserted in the gap is a trapezoidal shunt 52 of magnetic material similar to that forming the pole pieces 51. A narrow gap 53, formed by a nonmagnetic spacer or the like, is provided along each edge of the shunt 52, between it and the pole piece 51 to each side thereof.

If the angle between the pole pieces 38 in a transducer as illustrated in FIGS. 4 and 5 is relatively large, the flux density across the trapezoidal gap may not be sufficiently uniform to provide optimum results for recording sharp magnetic transitions. In such a situation it is desirable to employ a transducer such as illustrated in FIG. 6 for making the initial recordings on the disk. With such a transducer, a pulse through the coil (not shown) produces a magnetic flux at each of the two gaps 53, and the flux is substantially uniform throughout the extent of the gap so that a sharp magnetic transition can be produced in a recording film throughout the width of a position control zone.

Figure 7:
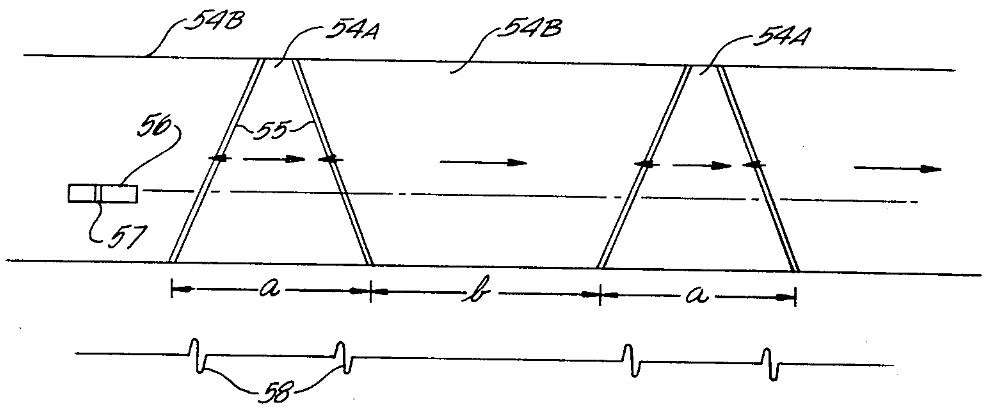
FIG. 7 illustrates schematically a pattern of magnetic transitions for controlling head position.

When such a transducer is employed, a pattern of magnetic recording, such as illustrated in FIG. 7, is produced. It will be apparent that FIG. 7 is semi-schematic and the size of the magnetic regions is somewhat exaggerated for purposes of illustration. Initially the entire control zone is magnetized with one magnetic polarity as indicated by the somewhat longer arrows in FIG. 7. The disk is then rotated so that a transducer such as that illustrated in FIG. 6 is passed along the length of the control zone or track, and the transducer is intermittently pulsed to produce narrow strips having the opposite magnetic polarity as indicated by the shorter arrows in FIG. 7. The result after this operation is a control track on the disk having a series of interlaced trapezoidal areas 54A and 54B separated by narrow strips 55 of opposite magnetic polarity from that of the trapezoidal areas. The strips 55 diverge relative to each other by the same angle as the gaps 53 (FIG. 6) in the recording transducer.

In using a recorded control track, as illustrated in FIG. 7, a control transducer 56 having a magnetic gap 57 is caused to scan along the length of the track during operation of the disk. Preferably, the magnetic gap 57 is of about the same order of size as the width of the strips 55. When gap 57 traverses one of the strips 55 of opposite polarity, a double pulse 58 is produced by the transducer due to the changing magnetic flux. The pulse 58 first courses positive, quickly followed by a negative-going portion (or vice versa), and then the signal from the transducer returns to its normal or zero output. The first portion of the pulse 58 is due to first encounter of the gap with the transition between a magnetic area 54B and a magnetic strip 55 of opposite polarity, and the second portion arises from the encounter of the gap with the transition from the magnetic polarity of the strip to that of the larger area 54A. In order to use such a pulse in conventional circuitry, differentiating means or discriminations to eliminate one of the excursions of the pulse can readily be employed.

Since all of the pulses 58 have both positive and negative-going portions, the polarity of the pulses cannot be used for discriminating the beginning and end of a control zone 54A, as distinguished from the interspersed unused zones 54B. It is, therefore, desirable to provide trapezoidal zones 54A, which are used for control, having a base *a* that is shorter than the truncated apex *b* of the trapezoidal area 54B. Such an arrangement is easily accomplished by spacing the recording pulses applied to the transducer, illustrated in FIG. 6, at sufficiently long time intervals that the disk has traveled a distance greater than the distance between the gaps 53 of the recording transducer. With such a recorded arrangement on the control track, the relatively shorter time intervals *a* are employed for controlling the position of the transducer transverse to the control track, and the relatively longer time intervals *b* are ignored. With such an arrangement, additional signal discrimination circuitry based on relative time intervals or successive trains of signal polarities can readily be provided in the control signal portion of the servo loop. Many other arrangements of patterns of magnetic transitions on the magnetic recording medium and specialized recording transducers for creating the pattern of control magnetic transitions will be apparent to one skilled in the art.

Figure 8:
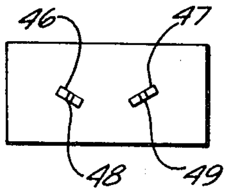
FIG. 8 illustrates schematically an improved control head for the combination of FIG. 1.

In the arrangement illustrated schematically in FIG. 3 the control transducer 26 in the control head 13 has its magnetic gap 27 arranged substantially normal to the edges of the control zone 18. It will be apparent that such a magnetic gap sweeps over the lines of magnetic transition at an angle $\phi$ which tends to spread the signal pulses over a short time interval. FIG. 8 illustrates an alternative control head 13' for providing sharper control pulses. Mounted in the improved control head 13' are a pair of magnetic transducers 46 and 47. The first of the transducers 46 has a magnetic gap 48 aligned so as to be parallel to one of the lines of magnetic transition 24 (FIG. 3). The other transducer 47 has a magnetic gap 49 aligned parallel with the other line of magnetic transition 23 (FIG. 3). By so aligning the magnetic gaps 48 and 49 of these magnetic transducers, each of the transducers produces a particularly sharp output signal as it crosses a transition with which it is parallel as compared with the magnetic gap 27 (FIG. 3) skewed relative to both lines of transition by an angle $\phi$. Since the distance between the magnetic gaps 48 and 49 of the two transducers is known, the feedback control system operates in the same manner as hereinabove described.

Although the method and apparatus for controlling information head position has been described and illustrated in relation to a disk memory file, it will be apparent to one skilled in the art that the same principles are equally applicable to drum memories or other magnetic memory systems. It will also be apparent that although in a preferred embodiment, the angles $\phi$ between the lines of magnetic transition and a disk radius are equal that other arrangements can be employed such as, for example, wherein one transition is parallel to a disk radius and the other is skewed, resulting in a "sawtooth" pattern of magnetic regions. Further, in the illustrated arrangement, the magnetic regions are in the form of symmetrical trapezoids; however, it will be apparent that substantially triangular areas can also be employed. However, it is preferred to truncate the apex of at least the triangle employed for generating the measuring time interval for minimizing the possibility of error when the control transducer is adjacent that edge of the control zone. If the rotational speed of the memory disk is not controlled with sufficient precision, a speed factor can be incorporated in the reference signal to assure precise position control. Many other modifications and variations of the present invention will be apparent to one skilled in the art. It is, therefore, to be understood that within the scope of the appended claims the invention may be practiced otherwise than as specifically described.

What is claimed is:

1. A combination comprising:

an information magnetic transducer head;

a magnetic recording medium on a face of a rotatable disk movable past the transducer head and having a circumferentially extending information zone;

a circumferentially extending control zone on the magnetic recording medium concentric with the information zone and radially spaced therefrom, said control zone having a plurality of magnetic transitions arranged diagonally relative to the direction of relative movement of the recording medium past the information head;

a control magnetic transducer mechanically linked to the information head; and means for positioning the control transducer in a radial direction in response to sensing of the magnetic transitions by the control transducer; and wherein the magnetic transitions comprise:

a first polarity of magnetic transition in lines skewed relative to disk radii at an angle $\phi$ clockwise from the respective radius; and a second polarity of magnetic transition in lines skewed relative to disk radii at an angle $\phi$ counterclockwise from the respective radius.

2. A combination comprising:

an information magnetic transducer head;

a magnetic recording medium on a face of a rotatable disk movable past the transducer head and having a circumferentially extending information zone;

a circumferentially extending control zone on the magnetic recording medium concentric with the information zone, said control zone having a plurality of magnetic transitions arranged diagonally relative to the direction of relative movement of the recording medium past the information head, said magnetic transitions comprising:

a first polarity of magnetic transition in lines skewed relative to disk radii at an angle $\phi$ clockwise from the respective radius, and a second polarity of magnetic transition in lines skewed relative to disk radii at an angle $\phi$ counterclockwise from the respective radius;

a control magnetic transducer mechanically linked to the information head;

means for positioning the control transducer in a direction transverse to the direction of relative movement in response to sensing of the magnetic transitions by the control transducer;

means for generating a reference signal;

means for comparing the time interval between adjacent magnetic transitions as sensed by the control transducer with the reference signal for producing an error signal; and means for positioning the control transducer in a radial direction in response to the error signal.

3. A magnetic memory system comprising:

a rotatable magnetic memory disk having a magnetic recording medium on a face thereof;

a circumferentially extending information zone on the recording medium for recording information in the form of magnetic signals;

a circumferentially extending control zone on the magnetic medium concentric with the information zone, said control zone including a plurality of magnetic transitions arranged in lines each at a known angle to a radius of the disk, the lines alternately converging and diverging in a direction extending radially outwardly on the disk;

a control magnetic transducer adjacent the control zone on the disk for sensing the magnetic transitions;

an information magnetic transducer connected to the control transducer and adjacent the information zone on the disk for recording and reading magnetic information signals;

means connected to the information an control transducers for positioning the transducers radially of the disk; and means for controlling the means for positioning in response to signals sensed by the control transducer.

4. A memory system as defined in claim 3 wherein the means for controlling comprises:

means for generating a reference signal representative of a desired control transducer position;

means for generating a control signal from the control transducer; and means for comparing the control signal and reference signal and applying the resultant error signal to the means for positioning.

5. A memory system as defined in claim 4 wherein the magnetic transitions comprise:

a first polarity of magnetic transition in lines skewed relative to disk radii at an angle $\phi$ clockwise from the respective radius; and a second polarity of magnetic transition in lines skewed relative to disk radii at an angle $\phi$ counterclockwise from the respective radius.

6. A magnetic memory system comprising:

a rotatable magnetic memory disk having a magnetic recording medium on a face thereof;

a circumferentially extending information zone on the recording medium for recording information in the form of magnetic signals;

a circumferentially extending control zone on the magnetic medium concentric with the information zone, said control zone including a plurality of magnetic transitions arranged in lines each at a known angle to a radius of the disk, the lines alternately converging and diverging in a direction extending radially outwardly on the disk;

a control magnetic transducer adjacent the control zone on the disk for sensing the magnetic transitions;

an information magnetic transducer connected to the control transducer and adjacent the information zone on the disk for recording and reading magnetic information signals;

means connected to the information and control transducers for positioning the transducers radially of the disk;

means for generating a reference signal representative of a desired control transducer position;

means for generating a control signal from the control transducer; and means for comparing the control signal and reference signal and applying the resultant error signal to the means for positioning; and wherein the magnetic transitions comprise;

a first pair of magnetic transitions of opposite polarity spaced apart in parallel lines, both lines being skewed relative to a disk radius at an angle $\phi$ clockwise from the respective radius; and a second pair of magnetic transitions of opposite polarity spaced apart in parallel lines, both lines being skewed relative to a disk radius at an angle $\phi$ counter-clockwise from the respective radius.

7. A method for positioning an information head adjacent a moving magnetic recording medium in a direction transverse to direction of relative movement therebetween comprising:

recording alternate regions of first and second magnetic polarity on the magnetic recording medium, the lines of magnetic transition between successive regions being diagonal to the direction of relative movement;

coupling the information head to a control transducer so that the information head position is directly responsive to control transducer position;

sensing the time interval between a pair of the magnetic transitions with the control transducer;

comparing the sensed time interval with a reference signal for generating a comparison signal; and positioning the control transducer in response to the comparison signal.

8. A method for recording a magnetic control signal comprising:

arranging a magnetic recording transducer having a pair of pole pieces separated by a trapezoidal gap free of magnetic material adjacent a magnetic recording medium magnetized with one polarity;

passing the transducer along a control track on the recording medium in a direction substantially parallel to the base of the trapezoidal gap; and producing interlaced trapezoidal areas of opposite magnetic polarity in the control track by intermittently pulsing the magnetic transducer.

9. A method for recording a magnetic control signal comprising:

arranging a magnetic recording transducer having a pair of pole pieces separated by a trapezoidal gap and having a trapezoidal magnetic shunt arranged in the gap and spaced apart from the edges thereof, adjacent a magnetic recording medium magnetized with one polarity;

passing the transducer along a control track on the recording medium in a direction substantially parallel to the base of the trapezoidal gap; and producing interlaced trapezoidal areas of like polarity separated by strips of opposite magnetic polarity in the control track by intermittently pulsing the magnetic transducer.

10. A magnetic recording transducer comprising:

first and second opposed magnetic pole pieces;

a trapezoidal magnetic gap between the first and second pole pieces;

a trapezoidal magnetic shunt positioned in the trapezoidal gap and spaced apart from the first and second pole pieces, respectively, for defining a pair of diverging magnetic gaps therebetween; and means for intermittently inducing a magnetic flux in the pole pieces and across the trapezoidal gap.

11. A magnetic memory system comprising:

a rotatable magnetic memory disk having a magnetic recording medium on a face thereof;

a circumferentially extending information zone on the recording medium for recording information in the form of magnetic signals;

a circumferentially extending control zone on the magnetic medium concentric with the information zone, said control zone including a plurality of magnetic transitions arranged in lines each at a known angle to a radius of the disk, the lines alternately converging and diverging in a direction extending radially outwardly on the disk; and means for positioning a magnetic transducer in a radial direction adjacent the disk in response to the time interval between a pair of the magnetic transitions.

12. A magnetic memory system as defined in claim 11 wherein each of the magnetic transitions is between a first substantially trapezoidal region having a second magnetic polarity.

13. A magnetic memory system as defined in claim 11 wherein each of the lines comprises a pair of spaced apart parallel magnetic transitions between a first polarity, a second polarity and the first polarity, respectively.

* * * * *

PO-1050
(5/69)

UNITED STATES PATENT OFFICE
CERTIFICATE OF CORRECTION

Patent No. 3,686,649 Dated August 22, 1972

Inventor(s) Michael I. Behr

It is certified that error appears in the above-identified patent and that said Letters Patent are hereby corrected as shown below:

Column 9, line 44, "an" should be --and--.

Column 12, line 21, Claim 12, insert --first magnetic polarity and a second substantially trapezoidal region-- between "a" (second occurrence) and "second".

Signed and sealed this 8th day of May 1973.

(SEAL)
Attest:

EDWARD M. FLETCHER, JR.
Attesting Officer

ROBERT GOTTSCHALK
Commissioner of Patents